United States Patent
Tkach et al.

(10) Patent No.: US 9,942,352 B2
(45) Date of Patent: Apr. 10, 2018

(54) METHOD AND SYSTEM FOR A CROWD SERVICE STORE

(71) Applicants: Vladimir Tkach, Kfar Yona (IL); Pavel Kravets, Ashdod (IL)

(72) Inventors: Vladimir Tkach, Kfar Yona (IL); Pavel Kravets, Ashdod (IL)

(73) Assignee: SAP PORTALS ISRAEL LTD., Ra'anana (IL)

( * ) Notice: Subject to any disclaimer, the term of this patent is extended or adjusted under 35 U.S.C. 154(b) by 490 days.

(21) Appl. No.: 14/508,054

(22) Filed: Oct. 7, 2014

(65) Prior Publication Data

US 2016/0100003 A1 Apr. 7, 2016

(51) Int. Cl.
H04L 29/08 (2006.01)
H04W 4/00 (2018.01)

(52) U.S. Cl.
CPC ........... *H04L 67/327* (2013.01); *H04W 4/003* (2013.01)

(58) Field of Classification Search
CPC .................. H04L 67/327; H04W 4/003
See application file for complete search history.

(56) References Cited

U.S. PATENT DOCUMENTS

| | | | | |
|---|---|---|---|---|
| 5,218,697 A * | 6/1993 | Chung | ............. | G06F 17/30569 707/E17.006 |
| 8,639,582 B1 * | 1/2014 | Sirota | .................... | G06Q 30/06 705/26.1 |
| 8,769,059 B1 * | 7/2014 | Chheda | ............... | H04L 41/0866 705/26.5 |
| 9,246,690 B1 * | 1/2016 | Roth | ...................... | H04L 9/3268 |
| 2003/0078934 A1 * | 4/2003 | Cappellucci | ............. | G09B 5/06 |
| 2004/0181576 A1 * | 9/2004 | Lin | ................... | G06F 17/30902 709/203 |
| 2005/0165902 A1 * | 7/2005 | Hellenthal | .............. | H04L 29/06 709/217 |
| 2011/0231899 A1 * | 9/2011 | Pulier | ................. | G06F 9/45558 726/1 |
| 2011/0264567 A1 * | 10/2011 | Clyne | .................... | G06Q 20/10 705/30 |
| 2012/0023545 A1 * | 1/2012 | Qu | .......................... | H04L 45/04 726/1 |
| 2012/0072925 A1 * | 3/2012 | Jenkins | ..................... | G06F 9/54 719/328 |
| 2013/0066771 A1 * | 3/2013 | Ciurea | ............... | G06Q 30/0201 705/39 |
| 2013/0086258 A1 * | 4/2013 | Kalgi | .................. | H04L 63/1408 709/224 |
| 2013/0219415 A1 * | 8/2013 | Jeon | ........................ | G06F 9/541 719/328 |
| 2014/0140213 A1 * | 5/2014 | Raleigh | .............. | H04L 41/0893 370/235 |

(Continued)

*Primary Examiner* — Uzma Alam

(74) *Attorney, Agent, or Firm* — Buckley, Maschoff & Talwalkar LLC

(57) ABSTRACT

A method, medium, and system to receive a request for a web-based service from an application, determine whether the requested service is available for consumption, invoke an application programming interface (API) call to the requested service, establish a communication connection between the application and the requested service, and deliver the requested service to the application over the established communication link, including management thereof.

12 Claims, 4 Drawing Sheets

(56) References Cited

U.S. PATENT DOCUMENTS

| | | | |
|---|---|---|---|
| 2014/0280961 A1* | 9/2014 | Martinez | H04L 41/5054 709/226 |
| 2015/0002614 A1* | 1/2015 | Zino | H04N 7/148 348/14.08 |
| 2015/0119033 A1* | 4/2015 | Maria | H04W 48/18 455/435.2 |
| 2015/0134827 A1* | 5/2015 | Shah | H04L 61/1547 709/226 |
| 2015/0142871 A1* | 5/2015 | Tofighbakhsh | H04W 4/003 709/203 |

* cited by examiner

200

```
┌─────────────────────────────────────────────────┐
│   RECEIVING A REQUEST FOR A WEB-BASED           │
│   SERVICE FROM AN APPLICATION                   │
│                                           205   │
└─────────────────────────────────────────────────┘
                        │
                        ▼
┌─────────────────────────────────────────────────┐
│   DETERMINING WHETHER THE REQUESTED SERVICE     │
│   IS AVAILABLE FOR CONSUMPTION                  │
│                                           210   │
└─────────────────────────────────────────────────┘
                        │
                        ▼
┌─────────────────────────────────────────────────┐
│   INVOKE AN APPLICATION PROGRAMMING INTERFACE (API) │
│   CALL TO THE REQUESTED SERVICE                 │
│                                           215   │
└─────────────────────────────────────────────────┘
                        │
                        ▼
┌─────────────────────────────────────────────────┐
│   ESTABLISH A COMMUNICATION CONNECTION BETWEEN  │
│   THE APPLICATION AND THE REQUESTED SERVICE     │
│                                           220   │
└─────────────────────────────────────────────────┘
                        │
                        ▼
┌─────────────────────────────────────────────────┐
│   DELIVER THE REQUESTED SERVICE TO THE APPLICATION OVER │
│   THE ESTABLISHED COMMUNICATION CONNECTION      │
│                                           225   │
└─────────────────────────────────────────────────┘
```

*FIG. 2*

300
HOST AT LEAST ONE WEB-BASED SERVICE
305
ESTABLISH A COMMUNICATION CONNECTION BETWEEN THE SERVICE AND AN APPLICATION REQUESTING THE SERVICE
310
MONITOR, AT LEAST, A USAGE OF THE SERVICE BY THE APPLICATION
315
STORE A RECORD OF THE MONITORED USAGE OF THE SERVICE BY THE APPLICATION
320
FIG. 3

METHOD AND SYSTEM FOR A CROWD SERVICE STORE

BACKGROUND

Web resources may be limited in some respects with when and how they may communicate with each other. In some aspects, a desired communication or interoperability between different web resources may not have been contemplated at the time the web resources were developed and deployed for use. Subsequent to their development, a desire or need to communicate with different web resources may be desired by service providers and service consumers.

In some contexts, such as a web-based system, service, or application, there may be an expectation of availability and communication between different web resources by users of the system, service, or application. Accordingly, communication between the different web resources may be desired.

BRIEF DESCRIPTION OF THE DRAWINGS

FIG. 2 is an illustrative flow diagram of a process, according to some embodiments;

FIG. 3 is an illustrative flow diagram of a process, according to some embodiments.

DETAILED DESCRIPTION

Figure 1:
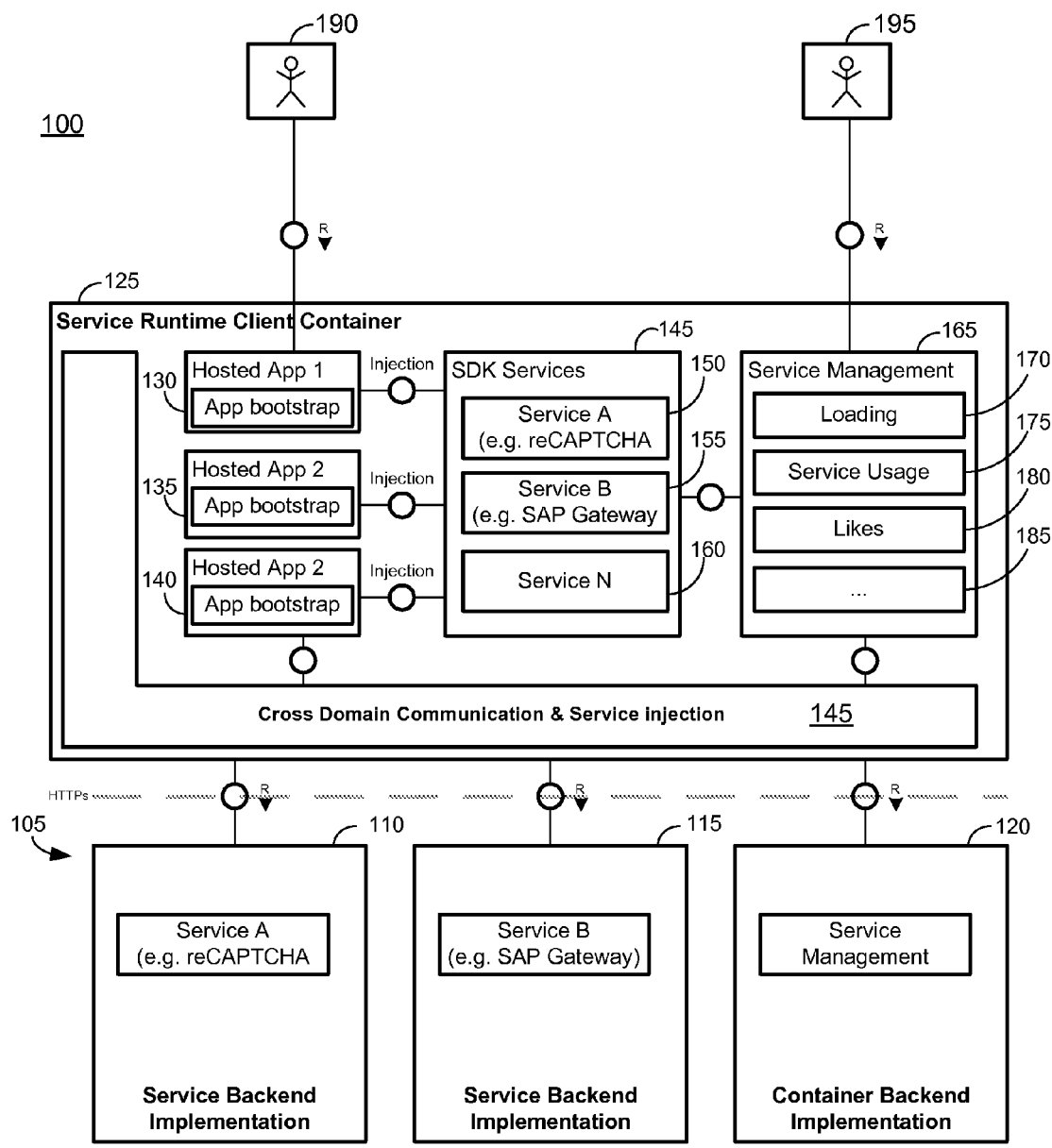
FIG. 1 is a schematic diagram of a logical architecture for a system, according to some embodiments.

FIG. 1 is a schematic block diagram of a system 100, according to some embodiments herein. System 100 represents a logical architecture for describing processes and a framework to expose a functionality of a web-based service to a web application, where the web application (i.e., application) may consume the web-based service (i.e, web service). In some embodiments, system 100 may provide a mechanism for managing various aspects of the disclosed framework, including but not limited to administrative and reporting functions associated with the delivery of the web service's functionality or capabilities to the application.

In general, system 100 includes at least one web service as illustrated at 105. The web services depicted in FIG. 1 are non-limiting examples of some services that may be facilitated and supported by system or framework 100. Service A referenced at 110 may be a spam and other automated abuse protection service and service B referenced at 115 may be an enterprise's portal to provide services to the users thereof. Additional and other services may be offered in cooperation with system 100 without limit and loss of generality, in accordance with other aspects of the present disclosure. Each of service A and service B may be implemented by one or more devices, apparatuses, and systems comprising a service backend implementation. The service backend implementation may include computer-implemented servers, controllers, databases, memories, caches, logic, and other devices.

In some aspects herein, the services depicted at 105 may be or may have been developed without knowledge of or consideration of system 100. That is, in some aspects services compatible with system 100 need not be designed or developed with any particular specification or features to work with system 100. In general, any service compatible with web-based applications, protocols, and browsers and the conventions therein (e.g., JavaScript, HTML 5, HTTPS, etc.) may be compatible with system 100.

System 100 further includes a service runtime client container 125. The service runtime client container 125 may also be referred to herein as a hosted environment or simply "the environment". In some embodiments, the service runtime client container 125 may be implemented as a hosting portal that hosts a plurality of web-based applications 130, 135, and 140. Applications 130, 135, and 140 may each be developed and deployed with a certain set of functionalities or capabilities. The capabilities of the applications may be determined and fixed during a development time of the applications.

In some instances, an entity 190 providing the hosting portal comprising environment 125 may want, require or otherwise desire to have a capability or functionality added to one or more of the hosted web applications 130, 135, and 140 that is not included in the web applications. The desired capability may have been developed after the development of the applications or it may have been developed and known during the development of the applications but not include in them for one or more reasons (e.g., different developers, not viewed as a desired capability, etc.). In some aspects, recoding and recompiling a service 110, 115 may be a complex and time-consuming venture. Furthermore, the desired service may not be implemented by the service's developer to an extent and/or on a schedule that agrees with the user entity 190. For these and/or other reasons, the user may desire a capability be added to an application (e.g., 130, 135, 140) to augment or enhance the functions of the application.

In some aspects, a developer of a web-based service may desire to deliver a desire or sought after service capability to users without having to recompile and recode their services. Some reasons may include avoiding the complexity and resource expenditure associated with recoding the service.

In some aspects, a user may want to add the functionality of service 110 to, for example, application 130 located in the client-side environment 125. In some embodiments, application 130 may not be able to communicate with and thus have access to the desired web service 110. Web browsers typically adhere to a domain isolation model wherein communication between web-based applications, services, and other web resources located on different domains is prohibited and generally impermissible. The domain isolation feature may be a design characteristic for many web browsers. An example of a domain isolation features include the use of the HTML element of iframes to encapsulate various segments of a browser window.

In some aspects, a cross-domain communication and service injection layer 145 of system 100 facilitates and supports communication across different domains. Using cross-domain communication and service injection layer 145, different web-based applications and services may communicate with each other even though they may be on different domains (e.g., hosted by different servers). In some embodiments, one or more of the services 150, 155, and 160 provided by service host 145 may be delivered to or "injected" to one or more application(s) 130, 135, 140 to add the functionality of the service to those particular application(s). The service may be delivered to the application even where the application and the web service are on different domains.

In some embodiments, the "injection" of the service to the application running in environment 125 is accomplished based on a HTML 5 messaging protocol that permits communication between the application and the service. In some aspects, other, different, or alternative communication protocols may be used.

In some aspects, the cross-domain communication and service injection layer 145 herein may be configured to have higher or greater privileges than the web resources (e.g., web applications and web services) it "brokers" a communication link or bridge for since it provides a level of access and communication not possible or permissible to the extent desired or requested by the web resources alone (i.e., without the intervention of the cross-domain communication and service injection layer 145).

Referring to FIG. 2, a process related to providing a platform or framework for delivery of a service to an application is disclosed. Process 200 may be implemented by a system, application, or apparatus configured to execute the operations of the process. In some embodiments, various hardware elements of an apparatus, device or system embodying system 100 executes program instructions to perform process 200. In some embodiments, hard-wired circuitry may be used in place of, or in combination with, program instructions for implementation of processes according to some embodiments. Program instructions that can be executed by a system, device, or apparatus to implement process 200 (and other processes disclosed herein) may be stored on or otherwise embodied as non-transitory, tangible media. Embodiments are therefore not limited to any specific combination of hardware and software.

Prior to operation 205, web services executing on a device or a server-side computing device (e.g., an application server) may be developed and deployed to one or more backend systems. Conversely, one or more web applications may be developed and deployed for execution on a client-side device. Process 200 may facilitate and support delivery of a service to the application that is not part of the application.

At operation 205, environment 125 may receive a request for a web-based service from a client-side hosted application. The request may specify a particular type of service functionality that is desired for delivery or injection to the application. In some instances, the request may be for a specific service, where the service is specified by its particular name.

At operation 210, a determination is made as to whether the requested service is available. For example, environment 125 may not host the requested service or even have access to the requested service. If the requested service is available on environment 125, then process 200 may proceed in an effort to deliver the service to the requesting application. In an instance the requested service is not available, then process 200 may terminate or return to operation 205.

In some aspects, the specifics and scope of the requested service may be determined based on the request. For example, the request may be fulfilled by one or more different services. Accordingly, environment 125 may determine which available service offers the "best match" to the requested service. The request may be analyzed to ascertain what specific features or functionality is desired. Furthermore, environment 125 may operate to review the services hosted thereby and/or registered therewith to determine the best match for the request.

At operation 215, environment 125 may invoke an application programming interface, API, call to the requested service. In some aspects, the applications 130, 135, and 140 may each have a mechanism, such as a bootstrap JavaScript, to load APIs for consuming the requested service.

At operation 220, a communication connection or bridge between the application and the requested service is established. The communication connection may be established via the cross-domain communication and service injection layer 145. At operation 225, the requested service is delivered to or "injected" to the application. In this manner, the functionality of the requested service may be delivered to the application at the client-side, without altering the service backend. The connection for injection of the service is between the service to be delivered and the application making the request or the application on whose behalf the request is made.

In some aspects, the service remains separate from the application requesting the service. For example, the backend system providing the service (server-side) may be unchanged by process 200.

FIG. 3 is a flow diagram of a process to manage a cross-domain delivery or injection of a service to an application that requests that service. In particular. Process 300 includes hosting at least one web-based service that may be delivered to a requesting application. Furthermore, process 300 includes establishing a connection between the service requested and the application requesting the service. The communication connection may be established as disclosed herein, including but not limited to the process of FIG. 2.

Operation 315 includes monitoring various aspects of the service(s) requested. Aspects monitored may at least include the usage of the service. For example, usage may encompass what application requests the service, how often the service is requested, by whom the service is requested, and other aspects. The data gathered by monitoring the requested service(s) may be used, in some embodiments, in determining what services to deliver in response to service requests. In some aspects, the data related to the monitored usage may be used in providing a report regarding the service(s). In some aspects, criteria for the determining of the best match may include at least one of a popularity, a usage rate, a version date, a version number, an expiry date, and combinations thereof for the requested web-based service. Such information may be beneficial in a business analytics context. Accordingly, a record of the monitored usage may be stored for further processing, including data analysis and reporting.

Figure 4:
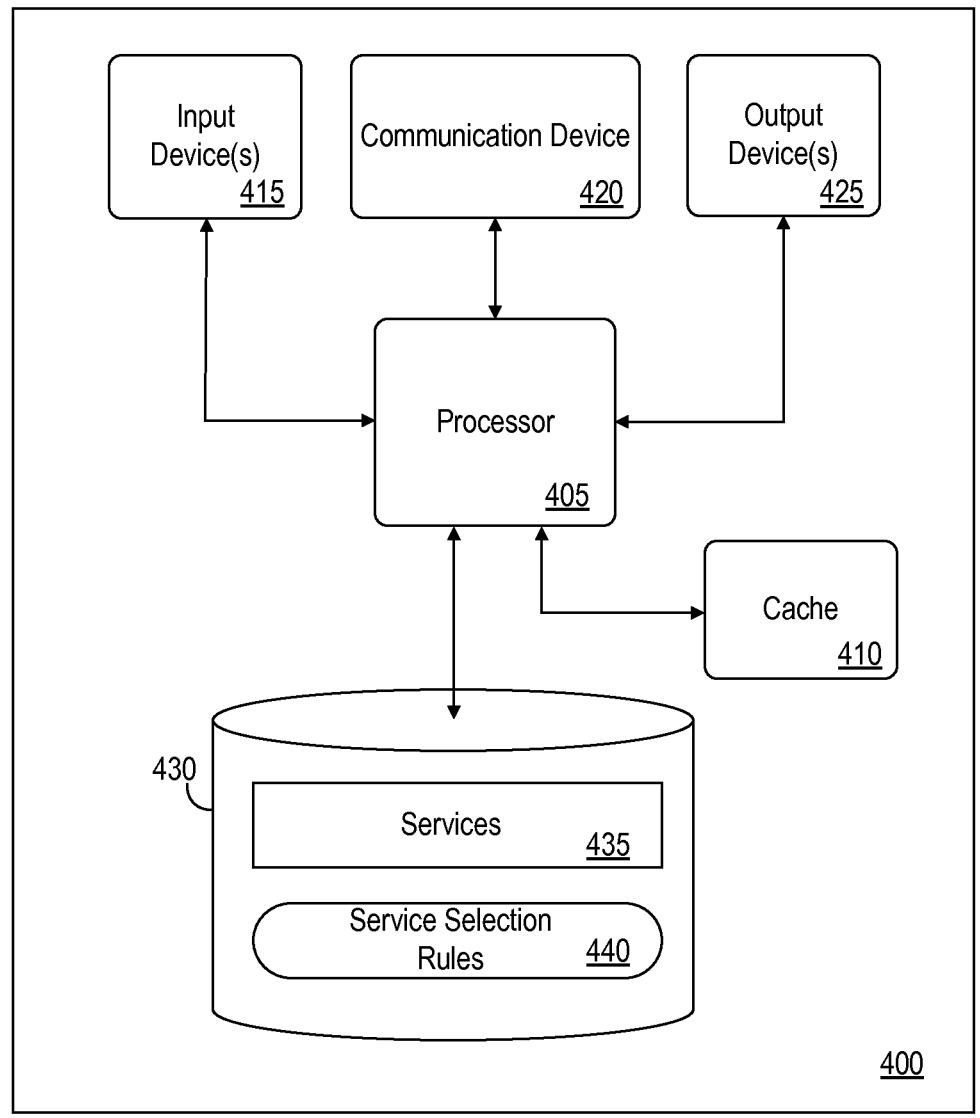
FIG. 4 is a block diagram of a computing device, in accordance with some embodiments.

FIG. 4 is a block diagram overview of a system or apparatus 400 according to some embodiments. System 400 may be, for example, associated with devices for implementing the platform and or processes disclosed herein. System 400 comprises a processor 405, such as one or more commercially available Central Processing Units (CPUs) in the form of one-chip microprocessors or a multi-core processor, coupled to a communication device 420 configured to communicate via a communication network (not shown in FIG. 4) to another device or system (e.g., a different web page or web service server). In the instance system 400 comprises a device or system, communication device 420 may provide a mechanism for system 400 to interface with a monitored entity (e.g., an application, device, system, or service). System 400 may also include a cache 410, such as RAM memory modules. The system may further include an input device 415 (e.g., a touchscreen, mouse and/or keyboard to enter content) and an output device 425 (e.g., a touchscreen, a computer monitor to display, a LCD display).

Processor 405 communicates with a storage device 430. Storage device 430 may comprise any appropriate information storage device, including combinations of magnetic storage devices (e.g., a hard disk drive), optical storage devices, solid state drives, and/or semiconductor memory devices. In some embodiments, storage device 430 may comprise a database system, including in some configurations an in-memory database.

Storage device 430 may store program code or instructions 435 that may provide processor executable instructions for delivering or injecting a service to an application, in accordance with processes herein. Processor 405 may perform the instructions of the program instructions 435 to thereby operate in accordance with any of the embodiments described herein. Program instructions 435 may be stored in a compressed, uncompiled and/or encrypted format. Program instructions 435 may furthermore include other program elements, such as an operating system, a database management system, and/or device drivers used by the processor 405 to interface with, for example, a monitored entity and peripheral devices (not shown in FIG. 4). Storage device 430 may also include data 440. Data 440 may be used by system 400, in some aspects, in performing one or more of the processes herein, including individual processes, individual operations of those processes, and combinations of the individual processes and the individual process operations. For example, data 440 may include service selection rules that may, in some instances, be used in determining which particular service to deliver to an application in response to a request for a service, in accordance with some embodiments herein.

All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

In some embodiments, aspects herein may be implemented by an application, device, or system to manage recovery of an entity or other application in a consistent manner across different devices, effectively across an entire domain.

Although embodiments have been described with respect to cloud-based entities, some embodiments may be associated with other types of entities that need not be cloud-based, either in part or whole, without any loss of generality.

The embodiments described herein are solely for the purpose of illustration. Those in the art will recognize other embodiments which may be practiced with modifications and alterations.

What is claimed is:

1. A method implemented by a computing system in response to execution of program instructions by a processor of the computing system, the method comprising:
   receiving, by a hosting environment hosting a first domain and a second domain, a request for a functionality of a web-based service hosted by the first domain from a client-side web application hosted by the second domain, the first and second domains hosting the application and the requested service being different from each other;
   determining whether the requested functionality of the service is available, on the hosting environment, for consumption;
   invoking, in response to a determination that the requested functionality of the service is available on the hosting environment, an application programming interface (API) call to the requested service;
   establishing, in response to the API call to the requested service, a cross-domain communication connection between the application and the requested service on the different domains by a cross-domain service injection layer of the hosting environment; and
   delivering, in response to the API call to the requested service, the requested functionality of the service to the application over the established cross-domain communication connection.

2. The method of claim 1, wherein the determining of whether the requested service is available for consumption comprises:
   determining a meaning of the request the functionality of service; and
   determining which one of at least one available web-based service is a best match for the determined meaning of the requested functionality of the service.

3. The method of claim 2, wherein criteria for the determining of the best match includes at least one of a popularity, a usage rate, a version date, a version number, an expiry date, and combinations thereof for the at least one available web-based services.

4. The method of claim 1, wherein the invoking of the API call, the establishing of the cross-domain communication connection between the application and the requested functionality of the service, and the delivering of the requested functionality of the service to the application over the established communication are performed client-side of a client server network.

5. The method of claim 1, wherein the requested functionality of the service is distinct from the application.

6. The method of claim 1, further comprising:
   receiving a request to register at least one web-based service; and
   registering the at least one web-based service, wherein the registered at least one web-service includes the requested functionality of the service.

7. A non-transitory medium storing processor-executable program instructions, the medium comprising program instructions executable by a computer to:
   receive, by a hosting environment hosting a first domain and a second domain a request for a functionality of a web-based service hosted by the first domain from a client-side web application hosted by the second domain, the first and second domains hosting the application and the requested service being different from each other;
   determine whether the requested functionality of the service is available, on the hosting environment, for consumption;
   invoke, in response to a determination that the requested functionality of the service is available on the hosting environment, an application programming interface (API) call to the requested service;
   establish, in response to the API call to the requested functionality of the service, a cross-domain communication connection between the application and the requested service on the different domains by a cross-domain service injection layer of the hosting environment; and
   deliver, in response to the API call to the requested service, the requested functionality of the service to the application over the established cross-domain communication connection.

8. The medium of claim 7, wherein the determining of whether the requested service is available for consumption comprises:
   determining a meaning of the request for the functionality of the service; and determining which one of at least one available web-based service is a best match for the determined meaning of the requested functionality of the service.

9. The medium of claim 8, wherein criteria for the determining of the best match includes at least one of a popularity, a usage rate, a version date, a version number, an expiry date, and combinations thereof for the at least one available web-based services.

10. The medium of claim 7, wherein the invoking of the API call, the establishing of the cross-domain communication connection between the application and the requested functionality of the service, and the delivering of the requested functionality of the service to the application over the established communication are performed client-side of a client server network.

11. The medium of claim 7, wherein the requested functionality of the service is distinct from the application.

12. The medium of claim 7, further comprising:
receiving a request to register at least one web-based service; and
registering the at least one web-based service, wherein the registered at least one web-service includes the requested functionality of the service.

* * * * *